United States Patent Office 3,304,602
Patented Feb. 21, 1967

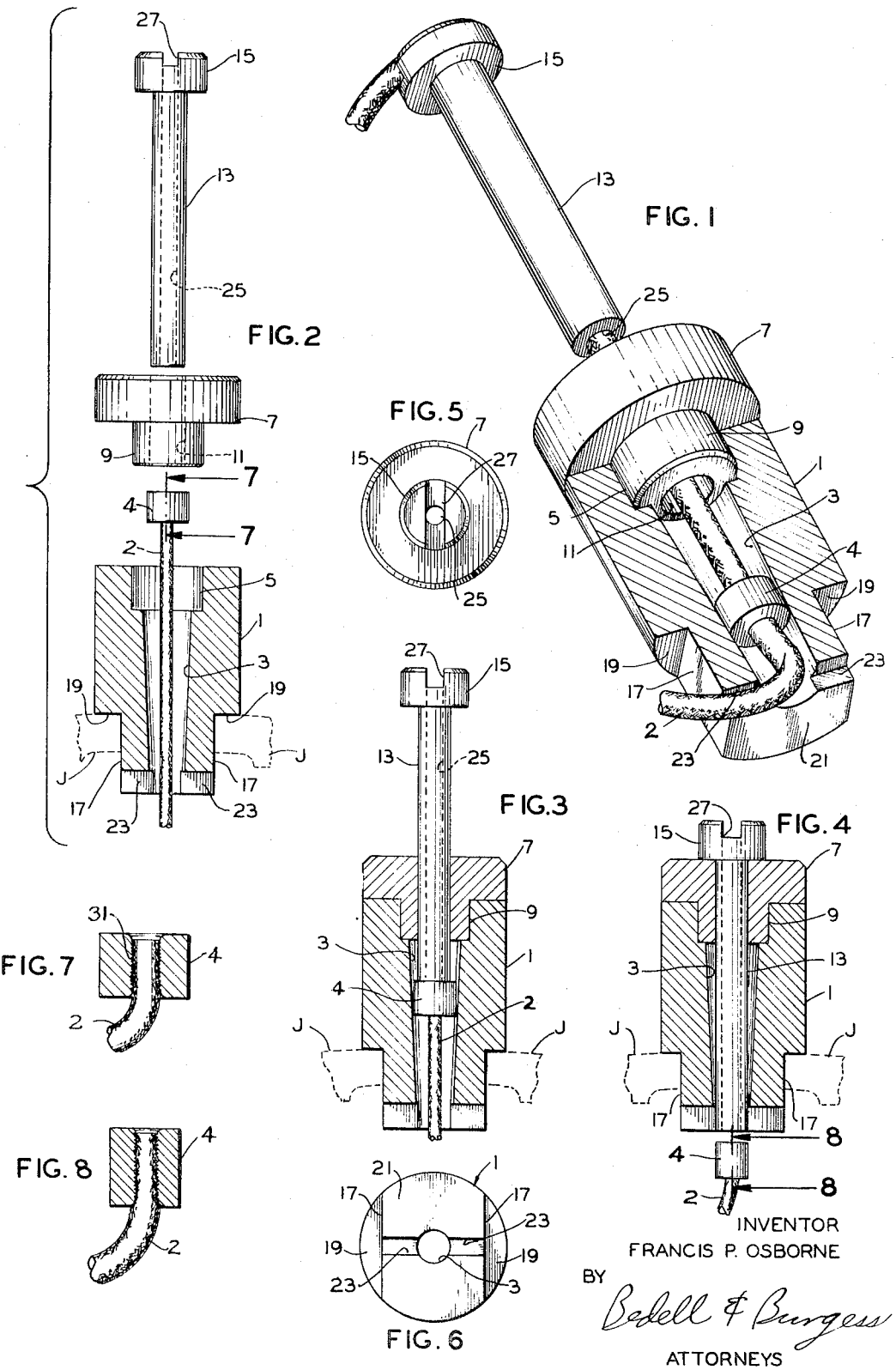

3,304,602
CLAMPING TOOL
Francis P. Osborne, 1402 Woodlawn,
Dallas, Tex. 75208
Filed June 16, 1965, Ser. No. 464,278
8 Claims. (Cl. 29—275)

The invention relates to a tool for clamping ferrules in the form of malleable collars to cords of nonmetallic material such as nylon.

In the past, when steel cables were almost universally used, ferrules were clamped to cables by means of pliers-type pincers, the steel windings of the cable being sufficiently hard and unyielding to embed themselves in the ferrule and thereby secure it in place. It is difficult, however, to securely grip a ferrule to a nylon cord in this manner because of the low coefficient of friction and the compressibility of the material.

Where cables are assembled in a shop, a bench-vise clamping tool may be used effectively to clamp ferrules to nylon cords, but heretofore no effective assembly tool has been available for use in the field where a bench-vise would not normally be available.

Accordingly, it is an object of the invention to provide a simple, compact, lightweight, easily transportable tool, usable in the field as well as in the shop, for securing ferrules to nonmetallic cords.

A further object is to provide such a tool capable of securing ferrules to nonmetallic cords intermediate the ends as well as in the end regions of the latter.

The foregoing and additional more detailed objects and advantages of the invention will be evident from the following description and accompanying drawings, in which:

FIG. 1 is a perspective view, partly sectionalized, of a tool made according to the invention, showing a length of cord and ferrule in position for clamping.

FIG. 2 is a diametral sectional view of the tool disassembled for insertion of a cord and ferrule.

FIG. 3 is a diametral sectional view of the tool assembled with a cord and ferrule inserted preparatory to the clamping operation.

FIG. 4 is a diametral sectional view of the device showing the relative positions of the tool parts and the ferrule and cord completion of the clamping operation.

FIGS. 5 and 6 are top and bottom views, respectively, of the device.

FIGS. 7 and 8 are diametral sectional views of the ferrule and cord before and after the clamping operation, respectively.

The tool comprises a die 1, having an elongated conical aperture 3 of circular cross section and having downwardly and inwardly sloping sides to receive cord 2 and ferrule 4, the upper end of aperture 3 being of greater diameter and the lower end being of less diameter than ferrule 4. The upper wide end of aperture 3 is further widened as at 5 and is of cylindrical shape. The die is provided with a separate cap 7 formed with a reduced cylindrical boss 9 of suitable size to be slidably received in the cylindrical recess 5. Cap 7 is provided with a cylindrical guide aperture 11 concentric with boss 9 and of substantially the same diameter to form a guide for pin 13 centering the latter with respect to aperture 3. Pin 13 is of suitable diameter to slide axially through aperture 11 and is at least as long as the combined lengths of die 1 and cap 7 so that when pin 13 is fully inserted, with its head 15 seated against the top of cap 7, its lower end will extend to the bottom of die aperture 3 forcing the ferrule out of the die, the downward movement of pin 13 having forced the ferrule downwardly through conical aperture 3 to compress the ferrule against cord 2.

Die 1 is preferably of cylindrical shape and is provided at its lower end with a pair of parallel flat surfaces 17 and associated transverse horizontal shoulders 19, so that, if used in a shop, the flattened end can be placed between jaws J of a bench-vise, with shoulders 19 seated on top of the jaws.

The bottom 21 of die 1 is also flat, so that it can be seated directly on a flat surface for use in the field when a bench-vise is unavailable, bottom 21 being formed with radial grooves 23 to accommodate the cord when the die is so utilized.

To permit passage of the cord through the pin when a bench-vise is unavailable, bottom 21 being formed with radial grooves 23 to accommodate the cord when the die is so utilized.

To permit passage of the cord through the pin when the device is used to clamp a ferrule on the cord intermediate its ends, pin 13 is formed with an axial hole and the top of pin head 15 with radial grooves 27 to prevent damage to the cord when the pin head is struck with a hammer.

Ferrule 4 is preferably a collar of malleable metal with a threaded central aperture 31 of sufficient diameter to facilitate insertion of cord 2.

Clamping a ferrule to a cord is accomplished as follows: Cap 7 and pin 13 are removed from die 1, cord 2 is positioned in aperture 3, and ferrule 4 is screwed on the upper end of cord 2, all as shown in FIG. 2. If a vise is available, die 1 is preferably mounted on it, with its flattened lower portion 17, 17 between the jaws and shoulders 19 resting on top of the jaws. If a vise is not available, the flat bottom 2 of die 1 can be rested on a flat solid surface and cord 2 bent to extend outwardly from aperture 3 through groove 23, thus permitting seating of flat bottom 21 on the supporting surface and avoid damage to the cord. When ferrule 4 is loosely seated in tapered aperture 3, as shown in FIG. 3, cap 7 is fitted on the die and pin 13 is permitted to slide through cap aperture 11 until it rests on top of ferrule 4. Pin 13 is then struck with a hammer, thus forcing ferrule 4 downwardly through the narrowing tapered aperture 3 to the position shown in FIG. 4, to compress the ferrule about cord 2 to the configuration shown in FIG. 8 in which the ferrule threads 31 grippingly engage the cord.

If it is desired to secure a ferrule at an intermediate position along the cord, the ferrule is screwed by means of its threads to the desired location on the cord, and the portion of the cord below it is extended outwardly through the bottom of aperture 3, while the upper portion of the cord is passed through aperture 25 in pin 13 and bent at the top of pin 13 to lie in groove 27 (FIG. 1), thus avoiding damage from the hammer blow required to drive the pin and ferrule to the locking position as seen in FIG. 4.

The details of the device may be modified substantially without departing from the spirit of the invention and the exclusive use of such modifications as come within the scope of the appended claims is contemplated.

What is claimed is:

1. A tool for securing ferrules to cords comprising a die having an aperture with downwardly and inwardly sloping sides, a pin movable axially in said aperture, and a guide for said pin removably mounted in the large end of said aperture whereby to permit the insertion thereinto of a malleable ferrule of greater width than the small end of said aperture.

2. A tool according to claim 1 in which said pin is hollow to permit the passage therethrough of a cord whereby the ferrule may be secured to the cord intermediate the ends of the latter.

3. A tool according to claim 2 in which the head of said pin is formed with a radial groove to receive the upwardly protruding end of the cord and protect it from hammer blows on the top of the pin.

4. A tool according to claim 1 in which said die has a flat bottom for stable support on a horizontal surface and is formed with a radial groove in said bottom extending outwardly from the bottom end of said aperture to the outer margin of said die to receive the downwardly protruding end of the cord and protect it from damage.

5. A tool according to claim 1 in which the lower portion of said die has parallel upright plane surfaces spaced apart a less distance than the width of said die immediately thereabove and horizontal shoulders defining the upper limits of said upright surfaces.

6. A tool according to claim 3 in which said die has a flat bottom for stable support on a horizontal surface, said bottom being formed with a radial groove extending between the bottom end of said aperture and the outer margin of said die to receive the downwardly protruding end of the cord and protect it from damage when the die is thus stably supported.

7. A tool according to claim 6 in which the lower portion of said die is formed with parallel upright flat surfaces spaced apart a less distance than the width of said die immediately thereabove and horizontal shoulders defining the upper limits of said upright surfaces.

8. A tool for securing ferrules to cords comprising a die having an inverted conical aperture through it, a cap for said die having a cylindrical aperture through it, the diameter of said cylindrical aperture being substantially equal to the minimum diameter of the conical aperture, said cap being arranged for application to the top of said die with said apertures axially aligned, a cylindrical pin slidably receivable in said cap aperture for engagement with a malleable ferrule of greater outside diameter than the minimum diameter of said conical aperture and seated in said conical aperture substantially above the minimum diameter outlet thereof, whereby upon application of downward pressure to said pin, the ferrule is forced downwardly through said tapered aperture to compress it radially and thus reduce its threaded inside diameter so as to grippingly engage a cord passing through the ferrule.

References Cited by the Examiner

UNITED STATES PATENTS

| | | |
|---|---|---|
| 490,181 | 1/1893 | Wolcott. |
| 2,390,598 | 12/1945 | Lepkowski _____ 29—282 |
| 2,839,823 | 6/1958 | Brancato _____ 29—275 |

WILLIAM FELDMAN, *Primary Examiner.*

J. C. PETERS, *Assistant Examiner.*